US010082151B2

(12) United States Patent
Gilarranz et al.

(10) Patent No.: US 10,082,151 B2
(45) Date of Patent: Sep. 25, 2018

(54) DAMPER SEAL FOR DOUBLE FLOW COMPRESSOR ARRANGEMENT (71) Applicant: DRESSER-RAND COMPANY, Olean, TX (US)

(72) Inventors: Jose L. Gilarranz, Katy, TX (US); Krishnaswamy Ramesh, Katy, TX (US)

(73) Assignee: DRESSER-RAND COMPANY, Olean, NY (US)

( * ) Notice: Subject to any disclaimer, the term of this patent is extended or adjusted under 35 U.S.C. 154(b) by 40 days.

(21) Appl. No.: 15/127,280

(22) PCT Filed: Mar. 20, 2015

(86) PCT No.: PCT/US2015/021628
§ 371 (c)(1),
(2) Date: Sep. 19, 2016

(87) PCT Pub. No.: WO2015/153146
PCT Pub. Date: Oct. 8, 2015

(65) Prior Publication Data
US 2017/0175755 A1    Jun. 22, 2017

Related U.S. Application Data (60) Provisional application No. 61/973,954, filed on Apr. 2, 2014.

(51) Int. Cl.
*F04D 29/10* (2006.01)
*F04D 29/12* (2006.01)
(Continued)

(52) U.S. Cl.
CPC .............. *F04D 29/12* (2013.01); *F16J 15/16* (2013.01); *F04D 29/08* (2013.01); *F16J 15/4472* (2013.01)

(58) Field of Classification Search
CPC ........ F16J 15/16; F16J 15/4472; F04D 29/12; F04D 29/08
See application file for complete search history.

(56) References Cited

U.S. PATENT DOCUMENTS 5,794,942 A    8/1998  Vance et al.
2005/0223737 A1  10/2005  Conry
(Continued)

FOREIGN PATENT DOCUMENTS

| EP | 2956675 A1 | 8/2014 |
| WO | 2012129475 A2 | 9/2012 |
| WO | 2012145486 A2 | 10/2012 |

OTHER PUBLICATIONS

PCT International Search Report and Written Opinion dated Jun. 25, 2015 corresponding to PCT Application PCT/US2015/021628 filed Mar. 20, 2015. (10 pages).

*Primary Examiner* — Gilbert Y Lee (57) ABSTRACT

A seal assembly for a dual-flow compressor is provided. The seal assembly may include an annular body disposed about a rotary shaft between a first compression assembly and a second compression assembly of the dual-flow compressor. An inner radial surface of the annular body and an outer radial surface of the rotary shaft may at least partially define a radial clearance therebetween. The annular body may have a first seal section and a second seal section at a first axial end portion and a second axial end portion thereof, respectively. The first and second seal sections may at least partially define a cavity therebetween. The seal assembly may also include a reference line communicably coupling the cavity with an inlet of the first compression assembly and configured to at least partially generate a pressure differential between the cavity and an outlet of the first compression assembly.

20 Claims, 5 Drawing Sheets (51) Int. Cl.
*F16J 15/16* (2006.01)
*F16J 15/447* (2006.01)
*F04D 29/08* (2006.01)

(56) References Cited

U.S. PATENT DOCUMENTS

2010/0034646 A1 2/2010 Margara et al.
2013/0129471 A1 5/2013 Gupta et al.

DAMPER SEAL FOR DOUBLE FLOW COMPRESSOR ARRANGEMENT

This application claims priority to U.S. Provisional Patent Application having Ser. No. 61/973,954, which was filed Apr. 2, 2014. The aforementioned patent application is hereby incorporated by reference in its entirety into the present application to the extent consistent with the present application.

BACKGROUND

Reliable and efficient compressors, such as centrifugal compressors, are often utilized in a myriad of applications and industrial processes (e.g., petroleum refineries, offshore oil production platforms, and subsea process control systems) to compress a process fluid. Centrifugal compressors may include one or more compressor stages, where each compressor stage may generally include an impeller and a diffuser. Developments in compressor designs have resulted in improved centrifugal compressors with compressor stages capable of achieving high compression ratios. Accordingly, the centrifugal compressors incorporating the high-pressure ratio compressor stages may compress the process fluid to increased pressures. The increased pressures of the process fluid, however, may apply reaction and/or excitation forces to a rotary shaft of the centrifugal compressor that may often generate or increase vibrations of the rotary shaft and lead to rotordynamic instability. The increased vibrations and the resulting rotordynamic instability may cause the rotary shaft to contact or impact one or more surrounding components (e.g., stationary components), thereby damaging the rotary shaft and/or the surrounding components.

In view of the foregoing, conventional centrifugal compressors may often incorporate a damper seal in a flowpath of the centrifugal compressor to reduce or dampen the vibrations of the rotary shaft. The damper seal may often include an annular member defining a plurality of openings along an inner radial surface thereof, and may be disposed about the rotary shaft such that the inner radial surface and the rotary shaft define a radial clearance or gap therebetween. In operation, the process fluid may flow axially through the clearance from an inlet to an outlet of the damper seal and become entrained or trapped in the openings disposed along the inner radial surface thereof. The entrainment of the process fluid in the openings may generate damping forces that may overcome cross-coupling stiffness and/or destabilizing forces acting upon the rotary shaft to thereby improve the rotordynamic stability.

For the damper seal to be effective, a minimum pressure differential between the inlet and the outlet of the damper seal may often be required to drive the process fluid through the clearance. Further, for improved effectiveness in damping the vibrations, the damper seal may often be disposed at or proximal a middle or mid-span of the rotary shaft, where the maximum deflection and/or vibrations of the rotary shaft may occur. For example, in some compressor configurations, such as a back-to-back centrifugal compressor, the damper seal may be disposed proximal the mid-span of the rotary shaft between a first compression assembly and a second compression assembly, and the pressure differential may be provided between a discharge of the first compression assembly (e.g., low-pressure area) and a discharge of the second compression assembly (e.g., high-pressure area). In other compressor configurations, such as a double or dual-flow centrifugal compressor, however, a pressure differential may not exist at the mid-span of the rotary shaft between the first and second compression assemblies. For example, the first and second compression assemblies of the dual-flow centrifugal compressor may be operated in parallel and have substantially equal discharge pressures. Accordingly, while the damper seals have proven to be effective in improving rotordynamic stability, the damper seals may have limited utility and/or applicability in the dual-flow centrifugal compressor due to the absence of a pressure differential across the damper seal located between the compression assemblies thereof.

What is needed, then, is an improved damper seal capable of reducing vibrations and improving rotordynamic stability of a rotary shaft in a dual-flow centrifugal compressor.

SUMMARY

Embodiments of the disclosure may provide a seal assembly for a dual-flow compressor having a first compression assembly and a second compression assembly disposed along a rotary shaft thereof. The seal assembly may include an annular body disposed about the rotary shaft between the first compression assembly and the second compression assembly. An inner radial surface of the annular body and an outer radial surface of the rotary shaft may at least partially define a radial clearance therebetween. The annular body may have a first seal section at a first axial end portion thereof and a second seal section at a second axial end portion thereof. The first seal section and the second seal section may at least partially define a cavity therebetween. The seal assembly may also include a reference line communicably coupling the cavity with an inlet of the first compression assembly. The reference line may be configured to at least partially generate a pressure differential between the cavity and an outlet of the first compression assembly.

Embodiments of the disclosure may also provide a dual-flow compressor. The dual-flow compressor may include a housing defining an inner cavity and having a first inlet nozzle, a second inlet nozzle, and at least one outlet nozzle. The dual-flow compressor may also include a rotary shaft supported in the inner cavity of the housing. The dual-flow compressor may further include a first compression assembly and a second compression assembly. The first compression assembly may be disposed along the rotary shaft and may have an inlet fluidly coupled with the first inlet nozzle and an outlet fluidly coupled with the at least one outlet nozzle. The second compression assembly may be disposed along the rotary shaft and may have an inlet fluidly coupled with the second inlet nozzle and an outlet fluidly coupled with the at least one outlet nozzle. The dual-flow compressor may also include an annular seal disposed radially outward of the rotary shaft between the first compression assembly and the second compression assembly. An inner radial surface of the annular seal and an outer radial surface of the rotary shaft may at least partially define a radial clearance therebetween. The annular seal may have a first seal section at a first axial end portion thereof and a second seal section at a second axial end portion thereof. The first seal section and the second seal section may at least partially define a cavity therebetween. The dual-flow compressor may further include at least one reference line communicably coupling the cavity with at least one of the inlet of the first compression assembly and the inlet of the second compression assembly.

Embodiments of the disclosure may further provide a method for reducing vibrations of a rotary shaft of a dual-flow compressor having a first compression assembly and a second compression assembly disposed along the rotary shaft. The method may include rotating the rotary shaft relative to an annular seal disposed radially outward of the rotary shaft between the first compression assembly and the second compression assembly. The method may also include directing a first stream of a process fluid to an inlet of the first compression assembly, and compressing the first stream in the first compression assembly to provide a first compressed stream at an outlet of the first compression assembly. The method may further include directing a second stream of the process fluid to an inlet of the second compression assembly, and compressing the second stream in the second compression assembly to provide a second compressed stream at an outlet of the second compression assembly. The method may also include communicably coupling a cavity of the annular seal with the inlet of the first compression assembly and the inlet of the second compression assembly to thereby generate a pressure differential between the cavity and the respective outlets of the first and second compression assemblies. The annular seal may have a first seal section and a second seal section at opposing axial end portions thereof, and the first seal section and the second seal section may at least partially define the cavity therebetween. The method may further include sealingly engaging the first seal section and the second seal section of the annular seal with the rotary shaft to maintain the pressure differential between the cavity and the respective outlets of the first and second compression assemblies, thereby reducing the vibrations of the rotary shaft.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1A:
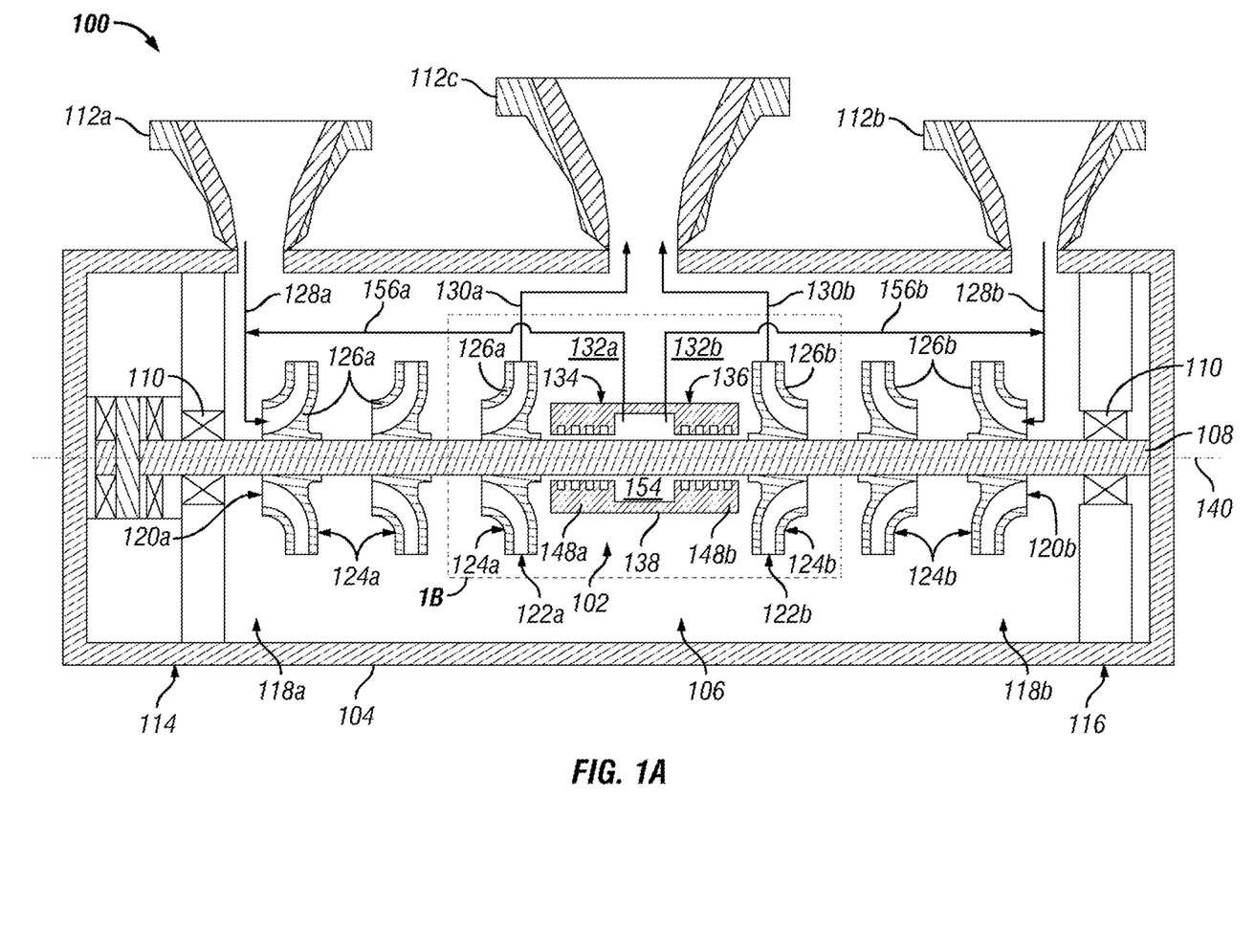
FIG. 1A illustrates a cross-sectional schematic view of an exemplary compressor including an exemplary seal, according to one or more embodiments disclosed.

FIG. 1A illustrates a cross-sectional schematic view of an exemplary compressor 100 including an exemplary seal 102, according to one or more embodiments. In at least one embodiment, the compressor 100 may include a casing or housing 104 defining an inner cavity 106, and a rotary shaft 108 supported in the inner cavity 106 of the housing 104. As illustrated in FIG. 1A, the rotary shaft 108 may be supported in the inner cavity 106 of the housing 104 by one or more bearings (two are shown 110) mounted or coupled with the housing 104. In at least one embodiment, the housing 104 may include a plurality of nozzles (three are shown 112a, 112b, 112c) fluidly coupled with the inner cavity 106. For example, as illustrated in FIG. 1A, the housing 104 may include two inlet nozzles 112a, 112b and one outlet nozzle 112c fluidly coupled with the inner cavity 106. As illustrated in FIG. 1A, a first inlet nozzle 112a and a second inlet nozzle 112b may be disposed at or proximal opposing axial end portions 114, 116 of the housing 104, and the outlet nozzle 112c may be disposed at or proximal a middle or mid-span of the housing 104 between the first and second inlet nozzles 112a, 112b.

In at least one embodiment, the compressor 100 may include two compression assemblies 118a, 118b disposed in the inner cavity 106 and axially spaced from one another along the rotary shaft 108. For example, as illustrated in FIG. 1A, a first compression assembly 118a and a second compression assembly 118b may be disposed along the rotary shaft 108 proximal the opposing axial end portions 114, 116 of the housing 104. In at least one embodiment, each of the compression assemblies 118a, 118b may include an inlet 120a, 120b, an outlet 122a, 122b, and one or more compressor stages 124a, 124b disposed between the inlet 120a, 120b and the outlet 122a, 122b. For example, as illustrated in FIG. 1A, the first compression assembly 118a may include three compressor stages 124a disposed between the inlet 120a and the outlet 122a thereof, and the second compression assembly 118a may include three compressor stages 124b disposed between the inlet 120b and the outlet 122b thereof. As illustrated in FIG. 1A, each of the compressor stages 124a, 124b may generally include an impeller 126a, 126b coupled with the rotary shaft 108 and configured to rotate with the rotary shaft 108 to compress or pressurize a process fluid. While each of the compression assemblies 118a, 118b illustrated in FIG. 1A have three compressor stages 124a, 124b, it may be appreciated that each of the compression assemblies 118a, 118b may include any number of compressor stages 124a, 124b.

In at least one embodiment, the compressor 100 may be a double or dual-flow compressor configured to receive and compress at least two separate streams or flows of the process fluid directed thereto. For example, the compression assemblies 118a, 118b of the compressor 100 may be configured to operate in parallel such that each of the compression assemblies 118a, 118b may receive and compress a separate stream of the process fluid introduced thereto. As illustrated in FIG. 1A, the inlet 120a of the first compression assembly 118 may be fluidly coupled with the first inlet nozzle 112a via line 128a, and the inlet 120b of the second compression assembly 118b may be fluidly coupled with the second inlet nozzle 112b via line 128b. The first compression assembly 118a may be configured to receive a first stream of the process fluid from the first inlet nozzle 112a at the inlet 120a thereof, and compress the first stream through the compressor stages 124a to thereby provide a first compressed stream at the outlet 122a thereof. Similarly, the second compression assembly 118b may be configured to receive a second stream of the process fluid from the second inlet nozzle 112b at the inlet 120b thereof, and compress the second stream through the compressor stages 124b to thereby provide a second compressed stream at the outlet 122b thereof. In at least one embodiment, the first and second compressed streams may be discharged from the compressor 100 via the outlet nozzle 112c. For example, as illustrated in FIG. 1A, the outlets 122a, 122b of the compression assemblies 118a, 118b may be fluidly coupled with the outlet nozzle 112c via lines 130a, 130b, respectively.

In at least one embodiment, a pressure differential may not be provided between the outlet 122a of the first compression assembly 118a and the outlet 122b of the second compression assembly 118b. In another embodiment, a minimal pressure differential may be provided between the outlet 122a of the first compression assembly 118a and the outlet 122b of the second compression assembly 118b. For example, a compression ratio of the first compression assembly 118a may be equal or substantially equal to a compression ratio of the second compression assembly 118b. Accordingly, a pressure of the first compressed stream at the outlet 122a may be equal or substantially equal to a pressure of the second compressed stream at the outlet 122b. In at least one embodiment, a first high-pressure region 132a disposed proximal the outlet 122a of the first compression assembly 118a may have a pressure equal or substantially equal to a pressure of a second high-pressure region 132b disposed proximal the outlet 122b of the second compression assembly 118b. In an exemplary embodiment, the first and/or second high-pressure regions 132a, 132b may be or include regions having a pressure relatively greater than one or more of the inlets 120a, 120b.

Figure 1B:
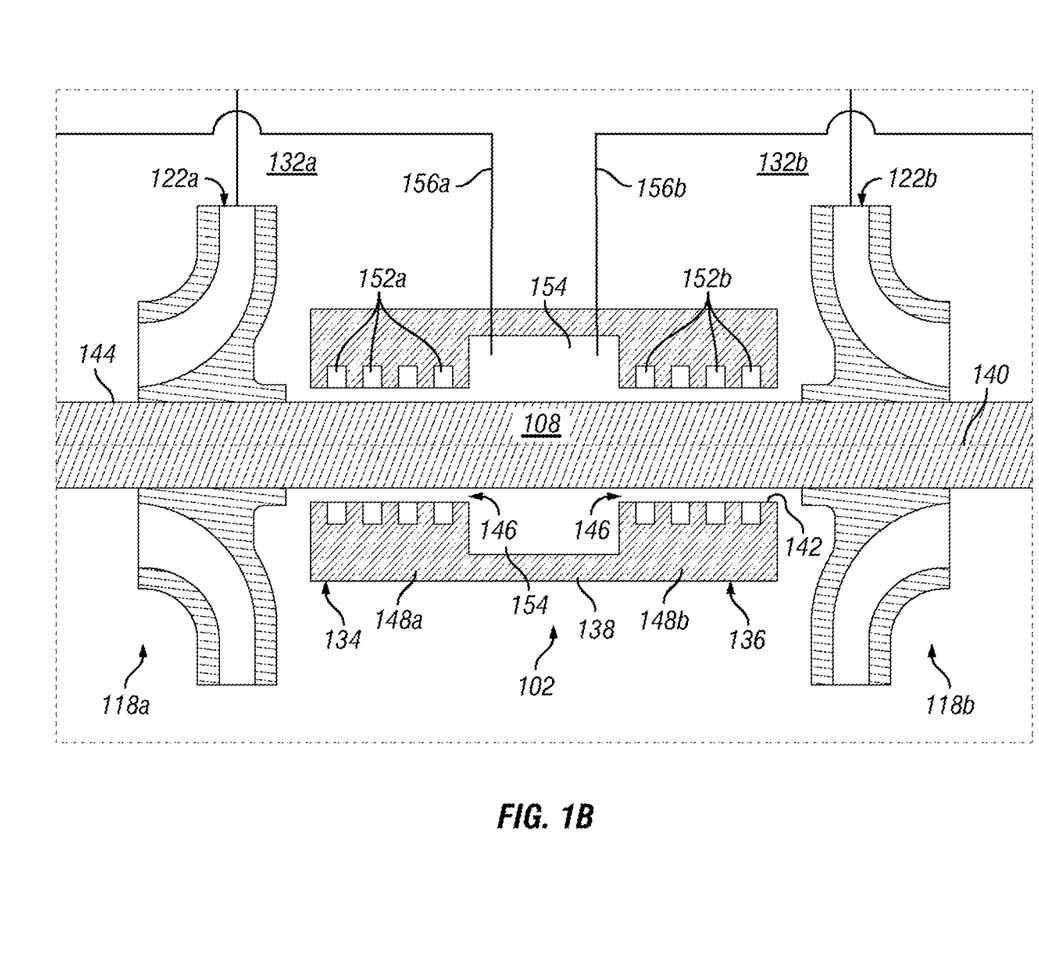
FIG. 1B illustrates an enlarged view of the portion of the compressor indicated by the box labeled "1B" of FIG. 1A, according to one or more embodiments disclosed.

In at least one embodiment, the seal 102 may be disposed about the rotary shaft 108 between the first compression assembly 118a and the second compression assembly 118b. For example, as illustrated in FIG. 1A, the seal 102 may be disposed about the rotary shaft 108 at a mid-span of the rotary shaft 108 between the first compression assembly 118a and the second compression assembly 118b. As further illustrated in FIG. 1A, the seal 102 may be disposed between the first and second compression assemblies 118a, 118b such that a first axial end portion 134 thereof may be proximal the first high-pressure region 132a and/or the outlet 122a of the first compression assembly 118a, and a second axial end portion 136 thereof may be proximal the second high-pressure region 132b and/or the outlet 122b of the second compression assembly 118b. In at least one embodiment, the seal 102 may be or include an annular body 138 coaxially aligned with the rotary shaft 108 along a longitudinal axis 140 of the rotary shaft 108. Referring to FIG. 1B, an inner radial surface 142 of the annular body 138 may extend circumferentially about and be radially-offset from an outer radial surface 144 of the rotary shaft 108. In at least one embodiment, the inner radial surface 142 of the annular body 138 and the outer radial surface 144 of the rotary shaft 108 may at least partially define a radial gap or clearance 146 therebetween.

In at least one embodiment, the seal 102 may include a plurality of seal sections (two are shown 148a, 148b) axially spaced from one another and configured to sealingly engage the rotary shaft 108. For example, as illustrated in FIG. 1B, the seal 102 may include a first seal section 148a disposed at or proximal the first axial end portion 134 of the annular body 138, and a second seal section 148b disposed at or proximal the second axial end portion 136 of the annular body 138. As further illustrated in FIG. 1B, the first seal section 148a may be disposed proximal or adjacent the first high-pressure region 132a and/or the outlet 122a of the first compression assembly 118a, and the second seal section 148b may be disposed proximal or adjacent the second high-pressure region 132b and/or the outlet 122b of the second compression assembly 118b. In at least one embodiment, each of the seal sections 148a, 148b may define a plurality of holes or openings 152a, 152b extending radially outward from the inner radial surface 142 of the annular body 138 to provide the seal 102 with hole-pattern seal sections. For example, as illustrated in FIG. 1B, the first seal section 148a may define a plurality of openings 152a to provide a first hole-pattern seal section, and the second seal section 148b may define a plurality of openings 152b to provide a second hole-pattern seal section.

Figure 3:
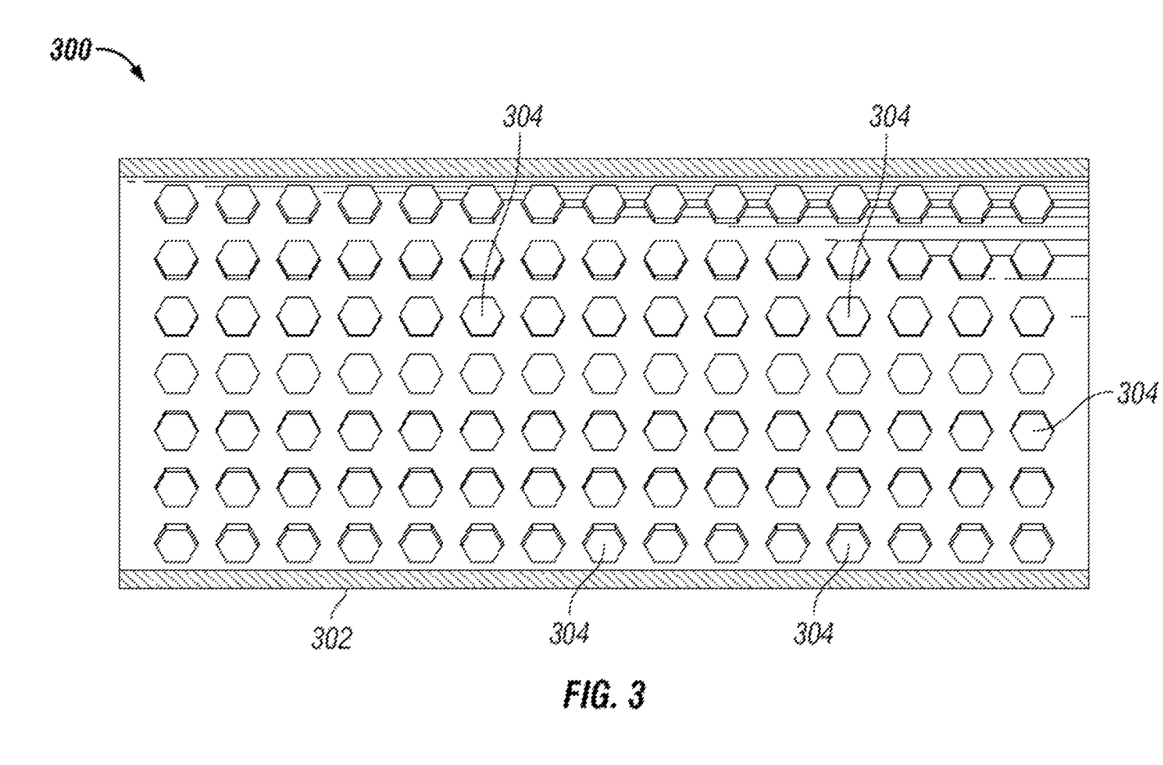
FIG. 3 illustrates a perspective view of an exemplary seal section of another seal, according to one or more embodiments disclosed.

While FIG. 1B illustrates the seal sections 148a, 148b as hole-pattern seal sections, it may be appreciated that each of the seal sections 148a, 148b may define any type of seal known in the art. For example, FIG. 3 illustrates a perspective view of a seal section 302 of another seal 300 that may be utilized in place of the seal 102 described above. As illustrated in FIG. 3, the seal section 302 may define a plurality of generally hexagonally-shaped openings 304 to provide the seal 300 with a honeycomb seal section.

Referring back to FIGS. 1A and 1B, in at least one embodiment, the annular body 138 of the seal 102 may at least partially define a cavity 154 disposed between the first and second seal sections 148a, 148b. The cavity 154 may extend annularly about at least a portion of the annular body 138. In at least one embodiment, the cavity 154 may maintain a pressure relatively lower than the pressures at the high-pressure regions 132a, 132b and/or the outlets 122a, 122b of the compression assemblies 118a, 118b. For example, the cavity 154 may be communicably coupled with or otherwise referenced to one or more low pressure references via one or more reference lines 156a, 156b to at least partially maintain the cavity 154 at a pressure relatively lower than the pressures at the high-pressure regions 132a, 132b and/or the outlets 122a, 122b. Accordingly, a pressure differential may be provided between the cavity 154 and the high-pressure regions 132a, 132b and/or the outlets 122a, 122b of the compression assemblies 118a, 118b.

In at least one embodiment, the low pressure references may be or include any machine, device, component, region, and/or cavity having a pressure relatively lower than the pressures at the outlets 122a, 122b of the compression assemblies 118a, 118b. For example, as illustrated in FIG. 1A, the low pressure references may be the inlets 120a, 120b of the compression assemblies 118a, 118b, and the cavity 154 may be communicably coupled with the inlets 120a, 120b via reference lines 156a, 156b and lines 128a, 128b, respectively. In another example, the low pressure references may be the first inlet nozzle 112a, the second inlet nozzle 112b, one or more intermediate compressor stages 124a, 124b of the compression assemblies 118a, 118b, a separate compressor (not shown), or any combination thereof.

In at least one embodiment, the first and second seal sections 148a, 148b may be configured to at least partially maintain the pressure differential between the cavity 154 and the high-pressure regions 132a, 132b and/or the outlets 122a, 122b of the compression assemblies 118a, 118b. For example, as illustrated in FIG. 1B, the first seal section 148a may be disposed between the first high-pressure region 132a and the cavity 154 and configured to sealingly engage the rotary shaft 108 to thereby prevent or reduce a flow of the process fluid (e.g., leakage) from the first high-pressure region 132a to the cavity 154 via the radial clearance 146. In another example, the second seal section 148b may be disposed between the second high-pressure region 132b and the cavity 154 and configured to sealingly engage the rotary shaft 108 to thereby prevent or reduce a flow of the process fluid (e.g., leakage) from the second high-pressure region 132b to the cavity 154 via the radial clearance 146. Accordingly, the first and second seal sections 148a, 148b may be configured to prevent or reduce the process fluid from leaking from the high-pressure regions 132a, 132b to the cavity 154, thereby maintaining the pressure differential between the cavity 154 and the high-pressure regions 132a, 132b.

In an exemplary operation of the compressor 100, with continued reference to FIGS. 1A and 1B, the seal 102 may be disposed about the rotary shaft 108 between the first and second compression assemblies 118a, 118b, and the cavity 154 may be communicably coupled with the inlets 120a, 120b of the compression assemblies 118a, 118b via reference lines 156a, 156b and lines 128a, 128b, respectively. The rotary shaft 108 may be rotated relative to the seal 102 and about the longitudinal axis 140. The rotation of the rotary shaft 108 may correspondingly rotate the impellers 126a, 126b coupled therewith. The first stream of the process fluid and the second stream of the process fluid may be introduced into the compressor 100 via the first inlet nozzle 112a and the second inlet nozzle 112b, respectively. The first compression assembly 118a may receive the first stream from the first inlet nozzle 112a at the inlet 120a thereof and progressively compress the first stream through the compressor stages 124a thereof to provide the first compressed stream at the outlet 122a. The second compression assembly 118b may receive the second stream from the second inlet nozzle 112b at the inlet 120b thereof and compress the second stream through the compressor stages 124b thereof to provide the second compressed stream at the outlet 122b. The first compressed stream and the second compressed stream may then be discharged from the compressor 100 via the outlet nozzle 112c.

In at least one embodiment, compressing the first stream and second stream in the first compression assembly 118a and the second compression assembly 118b, respectively, may generate or provide the high-pressure regions 132a, 132b proximal the respective outlets 122a, 122b of the first and second compression assemblies 118a, 118b. The high-pressure regions 132a, 132b may at least partially provide the pressure differential between the cavity 154 and the high-pressure regions 132a, 132b. Referring to FIG. 1B, the pressure differential between the cavity 154 and the high-pressure regions 132a, 132b may provide a flow of the process fluid (e.g., leakage) from each of the high-pressure regions 132a, 132b to the cavity 154 via the radial clearance 146. In at least one embodiment, the seal sections 148a, 148b of the seal 102 may sealingly engage the rotary shaft 108 to reduce the flow of the leakage from each of the high-pressure regions 132a, 132b to the cavity 154 and thereby maintain the pressure differential between the cavity 154 and the high-pressure regions 132a, 132b. The flow of the leakage may be reduced by flowing and/or expanding at least a portion of the leakage into the respective openings 152a, 152b defined in the seal sections 148a, 148b.

In at least one embodiment, the sealing engagement between the seal sections 148a, 148b and the rotary shaft 108 may at least partially dampen or reduce vibrations of the rotary shaft 108. For example, the flow and/or expansion of the leakage into the respective openings 152a, 152b of the seal sections 148a, 148b may dissipate at least a portion of the kinetic energy of the leakage that may lead to the vibrations of the rotary shaft 108. In another example, the flow and/or expansion of the leakage into the respective openings 152a, 152b of the seal sections 148a, 148b may at least partially reduce the propagation of circumferential flow perturbations within the leakage. In another example, the flow and/or expansion of the leakage into the respective openings 152a, 152b of the seal sections 148a, 148b may generate damping forces that may overcome cross-coupling stiffness and/or destabilizing forces acting upon the rotary shaft 108. In at least one embodiment, reducing the vibrations of the rotary shaft 108 may correspondingly increase rotordynamic stability of the rotary shaft 108.

Figure 2:
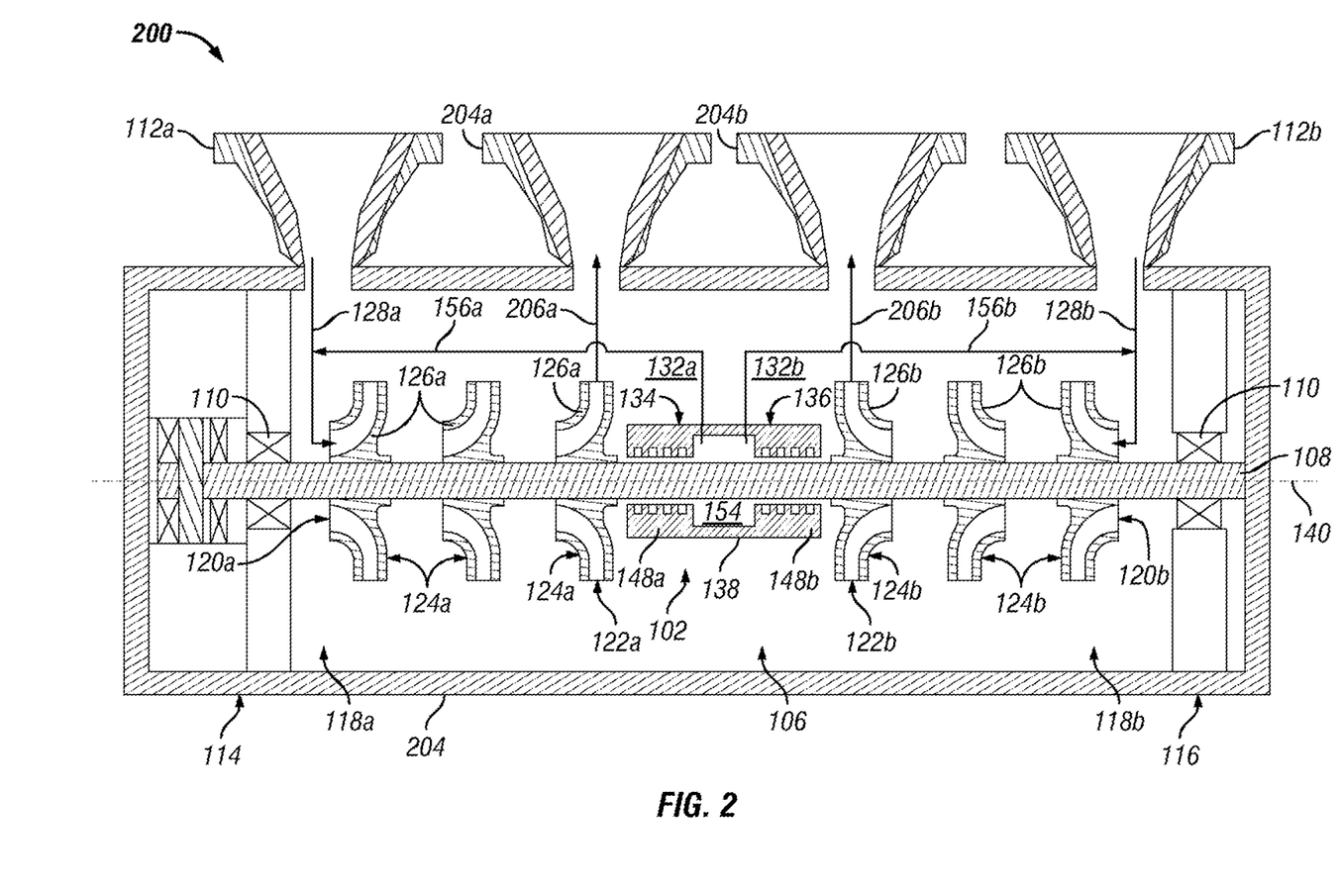
FIG. 2 illustrates a cross-sectional schematic view of another exemplary compressor including the seal of FIG. 1A, according to one or more embodiments disclosed.

FIG. 2 illustrates cross-sectional schematic view of another exemplary compressor 200 including the seal 102, according to one or more embodiments. The compressor 200 may be similar in some respects to the compressor 100 described above and therefore may be best understood with reference to the description of FIG. 1A where like numerals designate like components and will not be described again in detail. As illustrated in FIG. 2, the compressor 200 may include a housing 204 having the first and second inlet nozzles 112a, 112b, and two outlet nozzles 204a, 204b. As further illustrated in FIG. 2, the outlet 122a of the first compression assembly 118a may be fluidly coupled with a first outlet nozzle 204a via line 206a, and the outlet 122b of the second compression assembly 118b may be fluidly coupled with a second outlet nozzle 204b via line 206b.

In at least one embodiment, providing the two outlet nozzles 204a, 204b may allow the compressor 200 to be converted or configured between a dual-flow compressor, where the compression assemblies 118a, 118b may be operated in parallel, and a back-to-back compressor, where the compression assemblies 118a, 118b may be operated in series. For example, the compressor 200 operating as a dual-flow compressor may be converted to a back-to-back compressor by changing a bundle (e.g., the compression assemblies 118a, 118b) disposed in the housing 204. In another example, the compressor 200 operating as a dual-flow compressor may be converted to a back-to-back compressor by adjusting and/or modifying external components (e.g., process piping and/or control valves) coupled with the compressor 200. Accordingly, the compressor 200 may utilize the same housing 204 in both the dual-flow configuration and the back-to-back configuration, thereby reducing capital expenditures.

Figure 4:
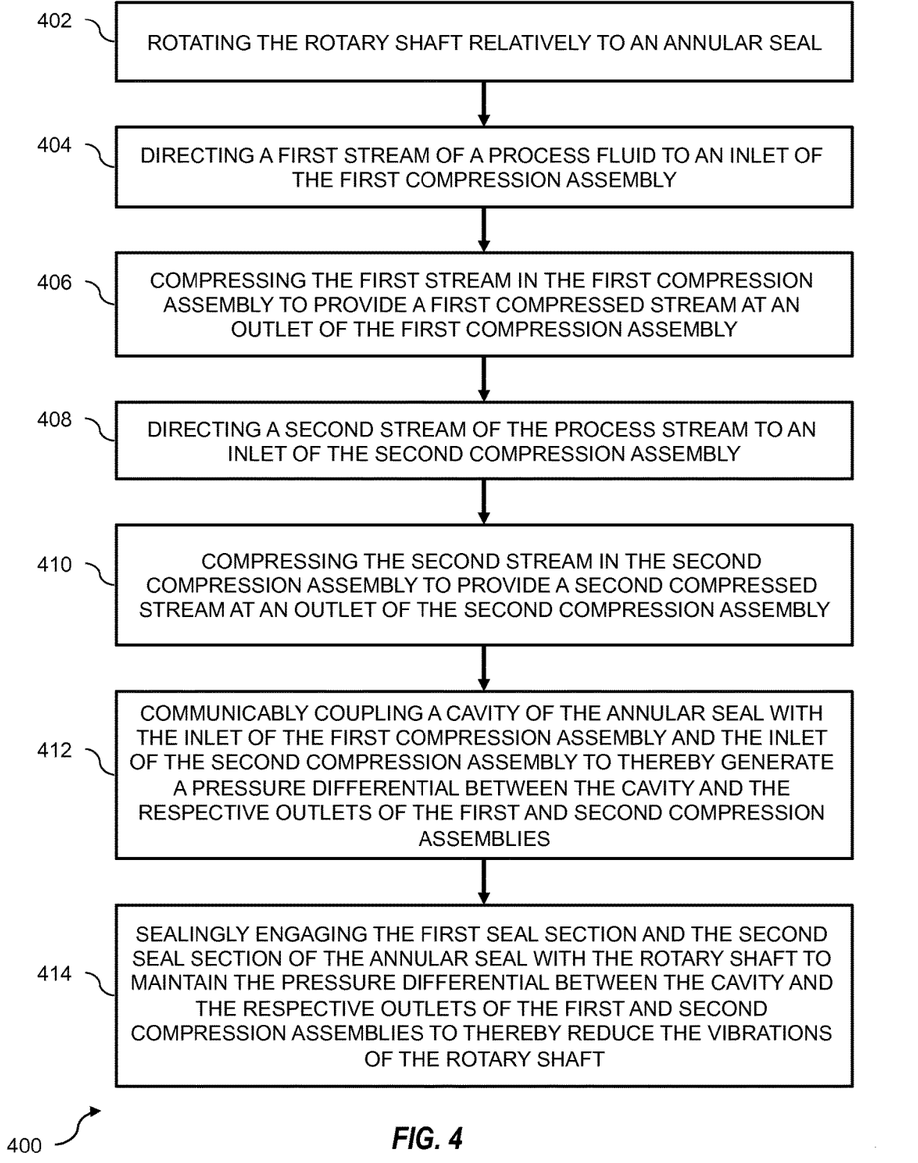
FIG. 4 illustrates a flowchart of a method for reducing vibrations of a rotary shaft of a dual-flow compressor, according to one or more embodiments disclosed.

FIG. 4 illustrates a flowchart of a method 400 for reducing vibrations of a rotary shaft of a dual-flow compressor, according to one or more embodiments. The dual-flow compressor may have a first compression assembly and a second compression assembly disposed along the rotary shaft. The method 400 may include rotating the rotary shaft relatively to an annular seal, as shown at 402. The method 400 may also include directing a first stream of a process fluid to an inlet of the first compression assembly, as shown at 404. The method 400 may further include compressing the first stream in the first compression assembly to provide a first compressed stream at an outlet of the first compression assembly, as shown at 406. The method 400 may further include directing a second stream of the process fluid to an inlet of the second compression assembly, as shown at 408. The method 400 may further include compressing the second stream in the second compression assembly to provide a second compressed stream at an outlet of the second compressed assembly, as shown at 410. The method 400 may also include communicably coupling a cavity of the annular seal with the inlet of the first compression assembly and the inlet of the second compression assembly to thereby generate a pressure differential between the cavity and the respective outlets of the first and second compression assemblies, as shown at 412. The annular seal may have a first seal section and a second seal section at opposing axial end portions thereof, and the first seal section and the section seal section may at least partially define the cavity therebetween. The method 400 may also include sealingly engaging the first seal section and the second seal section of the annular seal with the rotary shaft to maintain the pressure differential between the cavity and the respective outlets of the first and second compression assemblies to thereby reduce the vibrations of the rotary shaft, as shown at 414.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A seal assembly for a dual-flow compressor having a first compression assembly and a second compression assembly disposed along a rotary shaft thereof, the seal assembly comprising:

an annular body disposed about the rotary shaft between the first compression assembly and the second compression assembly, an inner radial surface of the annular body and an outer radial surface of the rotary shaft at least partially defining a radial clearance therebetween, the annular body having a first seal section at a first axial end portion thereof and a second seal section at a second axial end portion thereof, the first seal section and the second seal section at least partially defining a cavity therebetween, the annular body arranged between a first high-pressure region disposed proximal to an outlet of the first compression assembly and a second high-pressure region disposed proximal to an outlet of the second compression assembly; and a reference line communicably coupling the cavity with an inlet of the first compression assembly and configured to at least partially generate a pressure differential between the cavity and the outlet of the first compression assembly.

2. The seal assembly of claim 1, wherein each of the first seal section and the second seal section defines a plurality of openings extending radially outward from the inner radial surface of the annular body.

3. The seal assembly of claim 1, wherein each of the first seal section and the second seal section defines a plurality of hexagonally-shaped openings to thereby provide a first honeycomb seal section and a second honeycomb seal section, respectively.

4. The seal assembly of claim 1, further comprising another reference line communicably coupling the cavity with an inlet of the second compression assembly and configured to at least partially generate the pressure differential between the cavity and the outlet of the second compression assembly.

5. A dual-flow compressor, comprising:

a housing defining an inner cavity and having a first inlet nozzle, a second inlet nozzle, and at least one outlet nozzle;

a rotary shaft supported in the inner cavity;

a first compression assembly disposed along the rotary shaft and having an inlet fluidly coupled with the first inlet nozzle and an outlet fluidly coupled with the at least one outlet nozzle;

a second compression assembly disposed along the rotary shaft and having an inlet fluidly coupled with the second inlet nozzle and an outlet fluidly coupled with the at least one outlet nozzle;

an annular seal disposed radially outward of the rotary shaft between the first compression assembly and the second compression assembly, an inner radial surface of the annular seal and an outer radial surface of the rotary shaft at least partially defining a radial clearance therebetween, the annular seal having a first seal section at a first axial end portion thereof and a second seal section at a second axial end portion thereof, the first seal section and the second seal section at least partially defining a cavity therebetween; and at least one reference line communicably coupling the cavity with at least one of the inlet of the first compression assembly and the inlet of the second compression assembly.

6. The dual-flow compressor of claim 5, wherein each of the first seal section and the second seal section defines a plurality of openings configured to sealingly engage the outer radial surface of the rotary shaft.

7. The dual-flow compressor of claim 5, wherein the housing includes at least two outlet nozzles, the outlet of the first compression assembly being fluidly coupled with a first outlet nozzle, and the outlet of the second compression assembly being fluidly coupled with a second outlet nozzle.

8. The dual-flow compressor of claim 5, wherein the at least one reference line comprises a first reference line and a second reference line, the first reference line communicably coupling the cavity with the inlet of the first compression assembly and the second reference line communicably coupling the cavity with the inlet of the second compression assembly.

9. The dual-flow compressor of claim 5, wherein a compression ratio of the first compression assembly is substantially equal to a compression ratio of the second compression assembly.

10. A method for reducing vibrations of a rotary shaft of a dual-flow compressor, the dual-flow compressor having a first compression assembly and a second compression assembly disposed along the rotary shaft, the method comprising:
rotating the rotary shaft relative to an annular seal, the annular seal disposed radially outward of the rotary shaft between the first compression assembly and the second compression assembly;
feeding a first stream of a process fluid to an inlet of the first compression assembly;
compressing the first stream in the first compression assembly to provide a first compressed stream at an outlet of the first compression assembly;
feeding a second stream of the process fluid to an inlet of the second compression assembly;
compressing the second stream in the second compression assembly to provide a second compressed stream at an outlet of the second compression assembly;
communicably coupling a cavity of the annular seal with the inlet of the first compression assembly and the inlet of the second compression assembly to thereby generate a pressure differential between the cavity and the respective outlets of the first and second compression assemblies, the annular seal having a first seal section and a second seal section at opposing axial end portions thereof, the first seal section and the second seal section at least partially defining the cavity therebetween;
sealingly engaging the first seal section and the second seal section of the annular seal with the rotary shaft to maintain the pressure differential between the cavity and the respective outlets of the first and second compression assemblies, thereby reducing the vibrations of the rotary shaft.

11. The method of claim 10, further comprising discharging the first compressed stream and the second compressed stream through an outlet nozzle.

12. The method of claim 10, further comprising:
discharging the first compressed stream through a first outlet nozzle; and
discharging the second compressed stream through a second outlet nozzle.

13. The method of claim 10, wherein each of the first seal section and the second seal section defines a plurality of openings configured to sealingly engage the rotary shaft.

14. The method of claim 13, wherein sealingly engaging the first seal section and the second seal section of the annular seal with the rotary shaft to maintain the pressure differential between the cavity and the outlets of the first and second compression assemblies comprises:
expanding at least a portion of the first compressed stream in the plurality of openings of the first seal section; and
expanding at least a portion of the second compressed stream in the plurality of openings of the second seal section.

15. The method of claim 10, wherein communicably coupling the cavity of the annular seal with the inlet of the first compression assembly and the inlet of the second compression assembly comprises:
communicably coupling the cavity and the inlet of the first compression assembly with a first reference line; and
communicably coupling the cavity and the inlet of the second compression assembly with a second reference line.

16. The method of claim 10, wherein compressing the first stream in the first compression assembly to provide the first compressed stream generates a first high-pressure region proximal the outlet of the first compression assembly.

17. The method of claim 16, wherein compressing the second stream in the second compression assembly to provide the second compressed stream generates a second high-pressure region proximal the outlet of the second compression assembly, a pressure of the first high-pressure region being substantially equal to a pressure of the second high-pressure region.

18. The method of claim 10, wherein a compression ratio of the first compression assembly is substantially equal to a compression ratio of the second compression assembly.

19. The method of claim 10, wherein the annular seal is disposed proximal a midspan of the rotary shaft.

20. The method of claim 10, wherein the inlet of the first compression assembly is fluidly coupled with a first inlet nozzle, and the inlet of the second compression assembly is fluidly coupled with a second inlet nozzle.

* * * * *